United States Patent [19]

Lisec

[11] Patent Number: 4,711,692

[45] Date of Patent: Dec. 8, 1987

[54] DEVICE FOR SMOOTHING SEALING COMPOUNDS IN INSULATING GLASS

[76] Inventor: Peter Lisec, Bahnhofstrasse 34, A-3363 Amstetten-Hausmening, Austria

[21] Appl. No.: 752,065

[22] Filed: Jul. 5, 1985

[30] Foreign Application Priority Data

Jul. 5, 1984 [AT] Austria ................................ 2172/84

[51] Int. Cl.[4] ................................................ B32B 31/04

[52] U.S. Cl. .................................... 156/486; 118/100; 118/101; 118/111; 156/109

[58] Field of Search ............... 156/109, 443, 468, 475, 156/486, 492; 118/100, 101, 108, 111; 427/359

[56] References Cited

U.S. PATENT DOCUMENTS

| | | | |
|---|---|---|---|
| 2,799,419 | 7/1957 | Scheib | 156/486 X |
| 3,733,237 | 5/1973 | Wolff | 156/109 X |
| 3,886,013 | 5/1975 | Bowser et al. | 156/109 |
| 4,155,798 | 5/1979 | Becker | 156/486 X |
| 4,334,947 | 6/1982 | Zaino | 156/486 |

*Primary Examiner*—David Simmons
*Attorney, Agent, or Firm*—Young & Thompson

[57] ABSTRACT

A device for smoothing the surfaces of filling material introduced into edge joints of insulating glass panes in corner zones thereof exhibits at least one smoothing roll movable relatively to the insulating glass pane, this roll being freely rotatable about an axis oriented transversely to the plane of the insulating glass pane. The smoothing roll (17, 18, 19, 20) is arranged at the free end of a supporting arm (24, 44) which latter, in turn, is freely swingably supported at a pivotably arranged lever arm (27). Preferably, four smoothing rolls (17, 18, 19, 20) are provided in total, each smoothing roll being associated with one corner (34, 47, 49) of an insulating glass pane (2) to be processed.

25 Claims, 4 Drawing Figures

Figure 1:
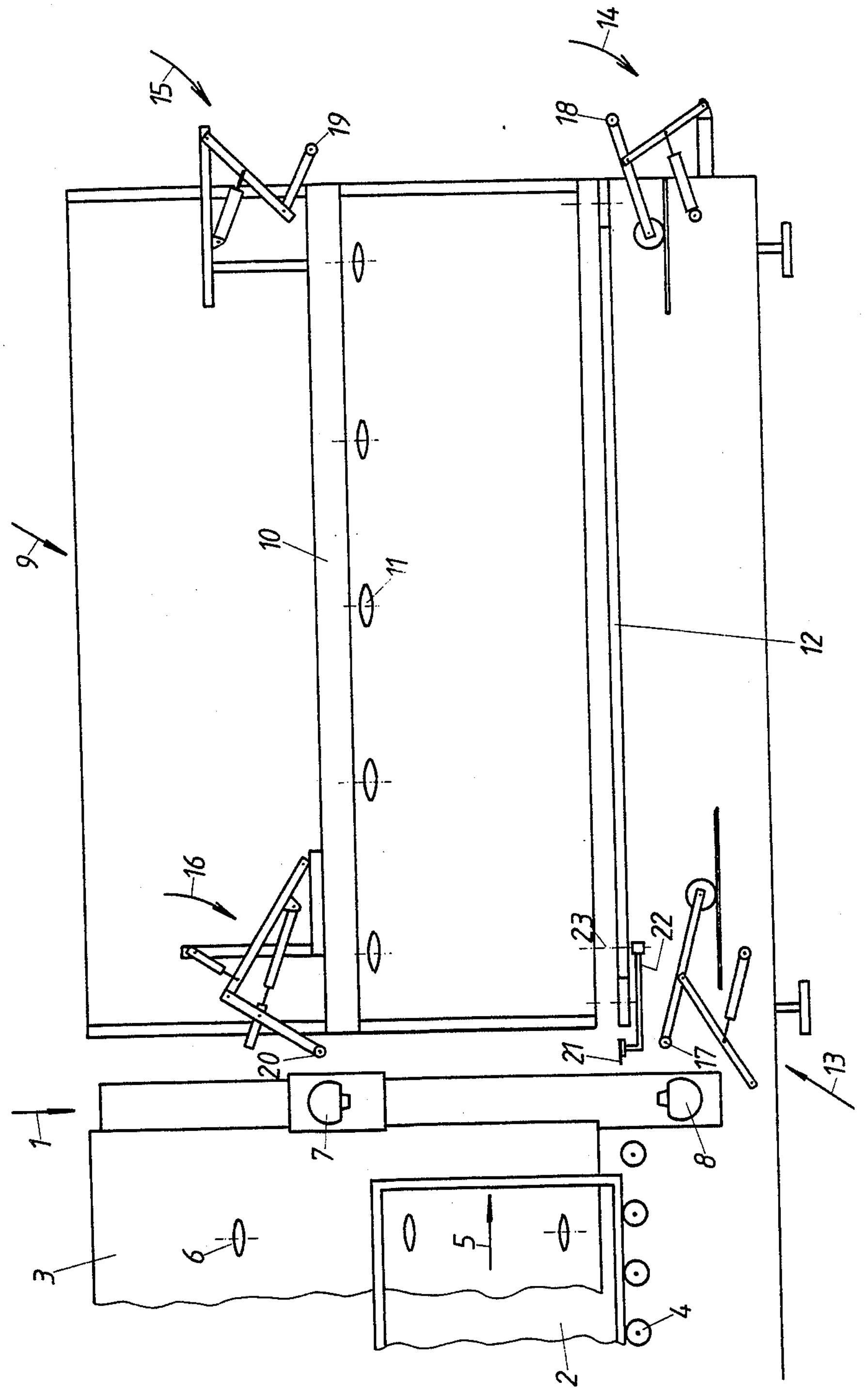

Fig.2
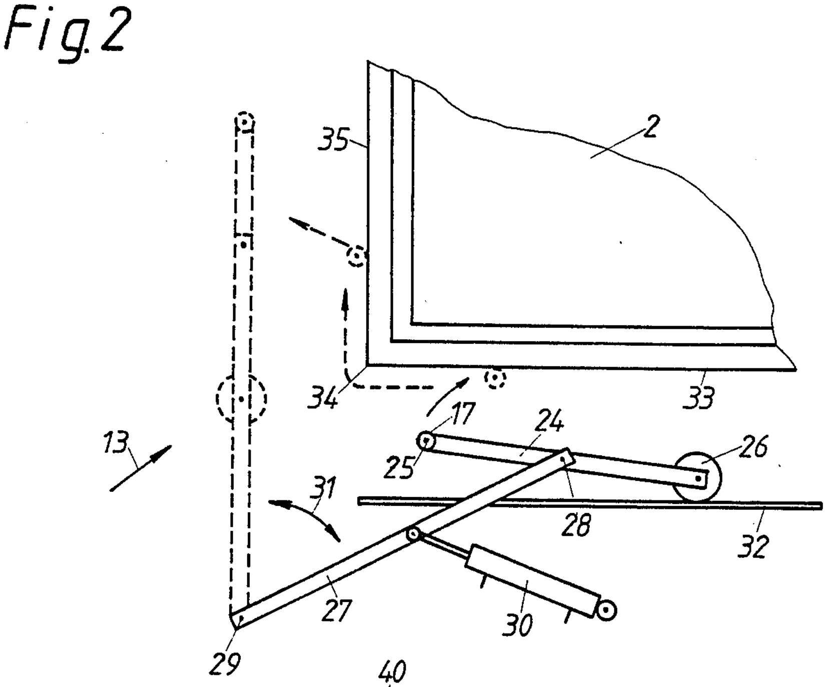
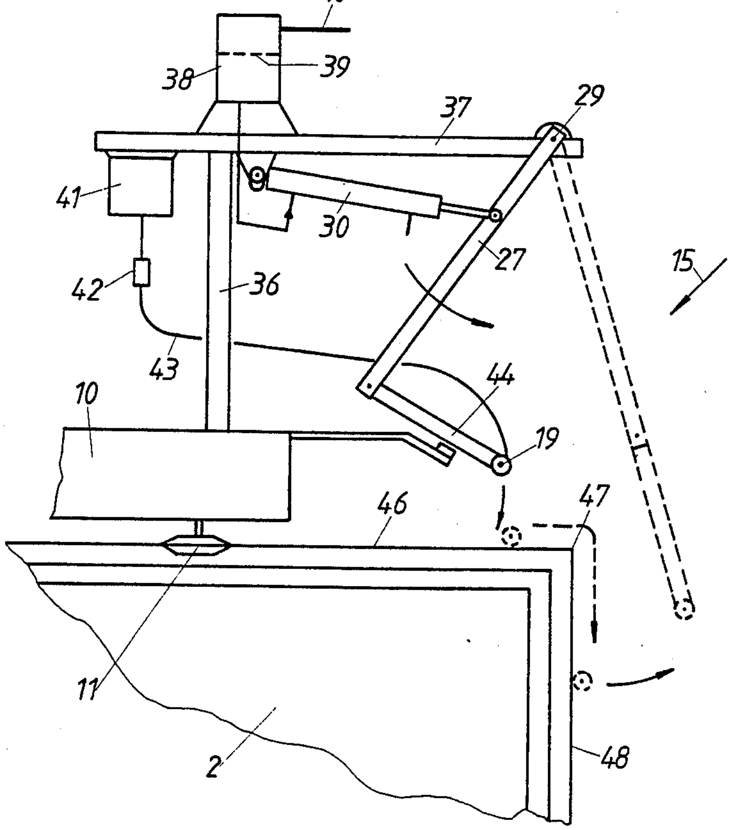
Fig.3

DEVICE FOR SMOOTHING SEALING COMPOUNDS IN INSULATING GLASS

The invention relates to a device for smoothing the surfaces of filling material introduced into edge joints of insulating glass panes in corner zones thereof, with at least one smoothing roll movable relatively to the insulating glass pane, this roll being freely rotatable about an axis oriented transversely to the plane of the insulating glass pane.

Troublesome bulges projecting past the outer rim of the glass panes are apt to be formed in the corner zone especially during the automatic sealing of unfinished insulating glass members, i.e. during the introduction of a sealing compound into the continuously extending marginal groove of an unfinished insulating glass.

Smoothing rolls integrated into sealing stations have been proposed in connection with elimination of these bulges, these rolls being mounted to pivotable lever arms. Pressure medium cylinders engaging the rocking levers are provided for operating the smoothing rolls and for urging the latter against the rims of the insulating glass panes. Since the conventional smoothing rolls are forced by pressure medium cylinders against the rims of the insulating glass panes, the contact pressure produced by the pressure medium cylinder requires expensive control measures. Moreover, the conventional smoothing rolls are to exert their function with the insulating glass panes being in motion, i.e. while the latter are conveyed through the device, so that additionaly an expensive control is required for the timely contacting of the smoothing rolls against the rims of the insulating glass panes. For all these reasons, this suggestion has not gained practical significance.

The invention is based on the object of providing a device of the type discussed hereinabove, making it possible to remove, preferably in all four corners of insulating glass panes, any troublesome bulges formed by projecting sealing compounds, by means of distribution of the material constituting the bulge.

The device of this invention, in attaining this object, is distinguished in that the smoothing roll is arranged at the free end of a supporting arm that is freely swingably mounted to a pivotably mounted lever arm.

Due to the fact that the smoothing rolls, in the device of this invention, are provided at supporting arms articulated to the lever arms, these rolls can be moved, with pivoting of the lever arms, around the corners of the insulating glass panes, the contact pressure being entirely independent of the force expended by the pressure medium cylinders for operating the lever arms. Moreover, the smoothing rolls can be moved, in the device according to this invention, around the corners of the insulating glass panes while the latter are at a standstill. Thereby, the device of this invention dispenses with expensive control means for the contacting of the smoothing rolls against the insulating glass pane at the right instant.

Another advantage of the device of this invention resides in that it can be integrated without any problems into conventional automatic sealing installations for insulating glass, as known, for example, from German Pat. Nos. 2,816,437 and 2,846,785, and which comprise, for filling the edge joints, one, two, three or four correspondingly movable filling nozzles, or, for the filling of laminated insulating glass, multiple filling nozzles. The conveying unit arranged following the filling nozzles for sealed insulating glass can be designed with special advantage as disclosed in German Pat No. 3,038,425.

Figure 4:
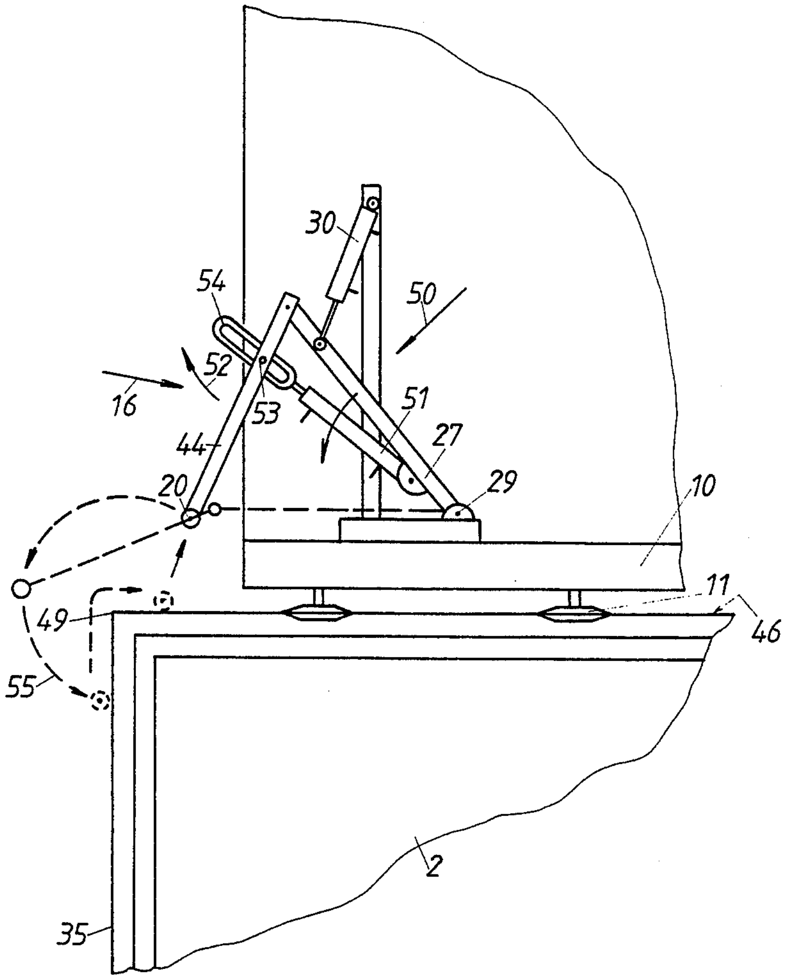

Additional details and features of the invention can be derived from the dependent claims and from the description set forth below relating to the embodiment of the invention schematically illustrated in the drawings wherein:

FIG. 1 shows, in an extensively schematized over-all view, a sealing station for insulating glass equipped with the smoothing rolls of this invention, and FIGS. 2–4 show, on an enlarged scale, the smoothing rolls associated with various corners of an insulating glass pane, and their motion processes.

The device 1 illustrated in FIG. 1 for sealing insulating glass 2 comprises a feeding conveyor 3 on which the unfinished insulating glass articles 2 are supplied while standing on conveyor rolls 4 (arrow 5); the unfinished insulating glass members are somewhat inclined rearwardly and rest against freely rotatable supporting rollers 6 of the feeding conveyor 3. Furthermore, two filling nozzles 7 and 8 are provided which fill, partially simultaneously, partially in succession, the horizontal and vertical edge joints of the unfinished insulating glass with a sealing compound. As indicated above, more or less than two filling nozzles can be provided for edge sealing in the device.

An installation 9 for discharging the edge-sealed insulating glass panes is arranged downstream of the device 1. This conveying installation can advantageously be designed as set forth in German Pat. No. 3,038,425, but instead of supporting the insulating glass pane by freely rotatable supporting rollers 11 provided at a beam 10 that can be adjusted upwards and downwards to adapt to various heights of insulating glass panes 2, it is also possible to provide other arrangements for the lateral supporting of the insulating glass panes, such as supporting roller zones or air cushion walls (neither of which is illustrated). Along their lower edge, the insulating glass panes 2 are supported in the conveying means 9 by horizontal bearings provided at chain hoists 12, which bearings do not contact the edge joint filled with sealing compound.

As can be seen from FIG. 1, four units 13, 14, 15 and 16 with smoothing rolls 17, 18, 19 and 20 are arranged at the conveying means 9, each of the four units being associated with one corner of an insulating glass pane 2. Thus, the unit 13 is associated with the lower corner that is at the rear, based on the conveying direction 5; the unit 14 with the lower corner that is at the front, based on the conveying direction 5; the unit 15 with the upper corner that is at the front, based on the conveying direction; and finally the device 16 with the upper, rearward corner, based on the conveying direction, of an insulating glass pane 2.

The arrangement is advantageously such that the units 13 and 16 become operative once the last edge—normally this will be the vertical edge of the insulating glass pane 2 that is at the rear, considering the conveying direction 5—has been completely filled with sealing compound, and the insulating glass pane 2 is located at the beginning of the conveying means 9. The units 14 and 15, associated with the two forward corners of the insulating glass pane 2, are activated once the edge-sealed insulating glass pane 2 stands at the end of the conveying means 9 on the outlet side, and is ready to be taken off.

It can furthermore be seen from FIG. 1 that a blade 21 is provided in the zone of the unit 13; this blade can be swung on a support 22 about an axis 23. The blade 21 is placed, during sealing of the rearward, vertical edge joint of the insulating glass pane 2, against the lower horizontal rim of the latter from below in the zone of the rearward, bottom corner, and there prevents deformation of the sealing compound, already present in the edge groove, by the downwardly moving filling nozzle 7.

As can be seen from FIG. 2, the smoothing roll 17 of the unit 13 is arranged at the end of a supporting arm 24 designed as a two-armed lever, and is there freely rotatable about an axle 25 extending transversely to the flat extension of the insulating glass pane 2. A weight 26 is attached to the other end of the supporting arm 24. The supporting arm 24 is mounted to be freely pivotable about an axle 28 at the free end of a lever arm 27. The lever arm 27 can be swung to and fro about an axle 29 affixed to the frame in the direction of the double arrow 31 under the action of a pressure medium motor 30. FIG. 2 furthermore shows that the weight 26, in the starting position of the smoothing roll 17 indicated in solid lines in FIG. 2, rests from above on a supporting surface 32 which is part of the frame. If, now, the lever arm 27 is pivoted upwardly about its axle 29 by operating the pressure medium motor 30, then the smoothing roll 17 moves into contact with the lower rim 33 of the insulating glass pane 2 and travels along the dashed-line arrow around the rearward, lower corner 34 up into the zone of the rearward, perpendicular rim 35 of the insulating glass pane 2. During this step, the smoothing roll 17 rests against the rims 33 and 35 exclusively under the effect of the weight 26. It can furthermore be seen that the contact pressure of the smoothing roll 17 on the rim of the insulating glass pane decreases during motion of smoothing roll 17 around the corner 34, since the effective lever arm between the bearing 28 and the weight 26 becomes increasingly smaller. At the end of the aforedescribed route, the smoothing roll 17 is in the position indicated in FIG. 2 in dashed lines. By reversing the motion of the pressure medium motor 30, the roll again resumes the rest or starting position shown in solid lines in FIG. 2 wherein the weight 26 rests on the supporting surface 32.

The unit 14 associated with the forward, lower corner of the insulating glass pane 2, with smoothing roll 18, corresponds with respect to structure and function essentially to the unit 13 described with reference to FIG. 2.

The unit 15, illustrated in FIG. 3, with its smoothing roll 19 is mounted in the illustrated embodiment to the beam 10 carrying the supporting rollers 11 so that the unit, without additional control measures, is in a position correct for working on the upward, front corner 47 of the insulating glass pane 2. If an installation 9 for carrying sealed insulating glass elements away is utilized which has no beam 10 with supporting rolls 11, but rather, for example, has an air cushion wall used as the lateral supporting means, then the units 15 and 16 can be displaceable upwards and downwards on slides running on essentially vertically extending guide means, so that the units can assume their position correct for working on the top corners.

A supporting trestle 36, 37 is mounted, pointing upwardly, at the beam 10; on this trestle, the lever arm 27 is mounted to be pivotable about an axle 29. Differently from the arrangement in units 13 and 14, the pivoting axle 29 in the unit 15 is located above the smoothing roll 19. Again, a pressure medium cylinder 30 is provided for operating the lever arm 27; this cylinder can be supplied with pressure medium from a tank 38 wherein a hydraulic medium is contained, this tank accommodating a displaceable piston 39 that can be acted upon by compressed air by way of a conduit 40. A uniform and recoilless movement of the lever arm 27 is achieved by the arrangement of this tank 38 which acts as a damper means. Similar damping devices are also correlated with the pressure medium motors of the other units 13, 14 and 16.

FIG. 3 furthermore shows that water can be fed to the smoothing roll 19, which latter has a jacket of foam material, for example, the water being introduced from a storage tank 41 through a metering device 42 via a conduit 43 terminating in the axle of the smoothing roll 19. On account of the thus-fed water, the foam jacket of the roll is saturated with water so that no sealing compound can adhere to the smoothing roll 19. Although this is not illustrated, the smoothing rolls 17, 18 and 20 comprise analogous devices for wetting their foam jackets.

In the starting position shown in FIG. 3, the supporting arm 44 for the smoothing roll 19, fashioned as a one-armed lever, abuts against a stop 45 attached to the beam 10. By operating the pressure medium motor 30, the lever arm 27 is pivoted, and the supporting arm 44 is detached from the stop 45 so that the smoothing roll 19 comes into contact, under its own weight and under the weight of the supporting arm 44, with the upper rim 46 of the insulating glass pane 2. By continued movement of the lever arm 27, the smoothing roll 19 travels around the corner 47 toward the rim 48 of the insulating glass pane 2 until it is lifted off exclusively from this rim 48. Then the smoothing roll 19, the lever arm 27 and the supporting arm 44 are in the position indicated in dashed lines in FIG. 3.

It can be seen that during movement of the smoothing roll 19 around the corner 47, the roll contacts the insulating glass pane 2 only under its own weight and the weight of the supporting arm 44 since the latter is suspended in a freely pendulating fashion on the lever arm 27.

In order to limit the stroke for moving the smoothing roll 19 away from the rim 48 of the insulating glass pane to a reasonable extent, a stop can be arranged at the supporting arm 44, preventing pivoting of the supporting arm 44 past the stretched position indicated in dashed lines in FIG. 23.

The unit 16 shown in FIG. 4, associated with the rearward upper corner 49 of the insulating glass pane 2, is likewise attached to the beam 10 of the conveying means 9. For this purpose, the lever arm 27 can be pivoted downwardly from the starting position shown in FIG. 4 on the horizontal leg of an auxiliary support 50 about the axle 29 under the action of a pressure medium motor 30, likewise supported on the auxiliary support. The supporting arm 44, likewise fashioned as a one-armed lever in the unit 16, is articulated to the free end of the lever arm 27. To be able to move the smoothing roll 20 during its travel from the rest position shown in FIG. 4 into its operative position wherein it is in contact with the rearward perpendicular edge of the insulating glass pane 2, without colliding with the corner 49 of the insulating glass pane 2, the supporting arm 44 can be pivoted upwardly in the direction of the arrow 52 by means of a further pressure medium motor 51 before the lever arm 27 is lowered. For this purpose, the supporting arm 44 carries a pin 53 fitting into the slot of an elongated ear 54 connected with the piston of the pressure medium motor 51. After activation of the pressure medium motor 51 and the pressure medium motor 30, the lever arm 27 and the supporting arm 44 are in the position indicated in FIG. 4 schematically by a dashed line. By retracting the elongated ear 54, the smoothing roll 20 moves in the direction of arrow 55 into contact with the rim 35 of the insulating glass pane 2. By lifting the lever arm 27, the smoothing roll 20 travels around the corner 49 onto the upper rim 46 of the insulating glass pane 2. During this process, the smoothing roll 20, similarly as the smoothing roll 19, contacts the rim of the insulating glass pane only under its own weight and under the weight of the lever arm 44.

Since the pin 53 of the lever arm 44 is accommodated in the slot of the elongated ear 54, the supporting arm 44 can move, during lifting of the lever arm 27, with respect to the latter without encumbrance.

On account of this special structure of the unit 16, the smoothing roll 20 of this unit 16 can be moved into a rest position wherein it does not impede the movement of the filling nozzles 7.

It can be seen that the contact pressure of the smoothing rolls during the course of their travel around the corners becomes smaller as a result of the special suspension of the smoothing rolls on freely pendulating supporting arms.

I claim:

1. Device for smoothing the surfaces of filling material introduced into edge joints of insulating glass panes in corner zones thereof, with at least one smoothing roll movable relatively to the insulating glass pane and freely rotatable about a first horizontal axis oriented transversely to the plane of the insulating glass pane, characterized in that the smoothing roll (17, 18, 19, 20) is arranged at the free end of a supporting arm (24, 44) which latter is freely pivotably connected for vertical swinging movement about a second horizontal axis to a lever arm (27) supported for vertical swinging movement about a third horizontal axis, all of said axes being parallel to each other, means (30) acting on the lever arm (27) to swing the lever arm to apply the smoothing roll to the glass pane, and weight means acting on said supporting arm (24, 44) to urge said smoothing roll (17, 18, 19, 20) toward the glass pane with a force no greater than the force generated by the action of gravity on said weight means.

2. Device according to claim 1, characterized in that a pressure medium cylinder (30) is provided for operating the lever arm (27).

3. Device according to claim 1, characterized in that the lever arm (27) is swingable about an axle (29) orientd perpendicularly to the plane of the insulating glass pane (2).

4. Device according to claim 2 characterized in that the pressure medium cylinders (30, 51) are operable hydraulically, and that each pressure medium cylinder (30, 51) is preceded by a tank (38) with hydraulic fluid wherein a piston (39) that can be acted upon by compressed air (40) is displaceably accommodated.

5. Device according to claim 1, characterized in that the smoothing roll (17, 18, 19, 20) exhibits a jacket of foam material, and that water can be supplied to the foam material jacket by way of a conduit (42, 43) of the smoothing roll extended into the bearing axles (25).

6. Device according to claim 1, characterized in that, in total, four smoothing rolls (17, 18, 19, 20) are provided, each smoothing roll being associated with one corner (34, 47, 49) of an insulating glass pane (2) to be processed.

7. Device according to claim 6, characterized in that the lever arms (27) of the smoothing rolls (19, 20) associated with the two upper corners (47, 49) of the insulating glass pane (2) are mounted so that they are adjustable in height.

8. Device according to claim 7, characterized in that the lever arms (27) of the two smoothing rolls (19, 20) associated with the upper corners (47, 49) of the insulating glass pane (2) are supported on slides guided displaceably on essentially vertically oriented guide means.

9. Device according to claim 7, characterized in that the lever arms (27) of the smoothing rolls (19, 20) associated with the two upper corners (47, 19) of the insulating glass pane (2) are supported on a beam (10) common to both of them, which beam can be shifted upwardly and downwardly along essentially vertically oriented guide means.

10. Device according to claim 6, characterized in that the lever arms (27) of the smoothing rolls (17, 18) associated with the two lower corners (34) of the insulating glass pane (2) are mounted to be swingable about axles (29) affixed to the frame, and that the supporting arms (24) are designed as two-armed levers exhibiting the smoothing roll (17, 18) on one end and a counterweight (16) on the other end.

11. Device according to claim 10, characterized in that the bearing point (28) of the supporting arm (24), the mounting point of the counterweight (26) and/or the mounting point of the smoothing roll (17, 18) are variable.

12. Device according to claim 10, characterized in that the counterweight (26) is attached to the supporting arm (24) so that the counterweight can be exchanged.

13. Device according to claim 10, characterized in that the end of the supporting arm (24) opposed to the smoothing roll (17, 18), or the provided weight (26), with the smoothing roll (17, 18) being in the rest position, rests from above on a supporting surface (32) that is part of the frame.

14. Device according to claims 10, characterized in that the smoothing roll (17, 18) are movable from below into their operating position wherein they are in contact with the lower horizontal rim (33) of the insulating glass pane (2) by activating the pressure medium cylinder (30) associated with the lever arm (27).

15. Device according to claim 14, characterized in that the smoothing rolls (17, 18), by continued operation of the pressure medium cylinder (30), are movable around the corner (34) of the insulating glass pane (2) and, by further operation of the pressure medium cylinder (30), can be lifted off the vertical rim (35, 48) of the insulating glass pane (2).

16. Device according to claim 10, characterized in that the smoothing rolls (17, 18) are held in contact with the insulating glass pane (2) by the counterweight (826).

17. Device according to claim 10, characterized in that the pivoting axles (29) of the lever arms (27) of the smoothing rolls (17, 18) associated with the two lower corners (34) are located below the smoothing rolls (17, 18), and that the lever arms (27) can be pivoted upwardly during contacting of the smoothing rolls (17, 18) against the rim (33) of the insulating glass pane (2) and during the travel of the smoothing rolls (17, 18) along the corner zone (34) of the insulating glass pane (2).

18. Device according to claim 6, characterized in that the pivoting axle (29) of the lever arms (27) of the smoothing rolls (19, 20) associated with the two upper corners (47, 49) of the insulating glass panes (2) are located above the smoothing rolls (19, 20).

19. Device according to claim 18, characterized in that the supporting arms (44) for the smoothing rolls (19, 20) are supporting arms (44) pendulating freely in the downward direction from the lever arms (827).

20. Device according to claim 18, characterized in that the supporting arm (44) of the smoothing roll (19); associated with the corner (47) of the insulating glass pane (2) that is the forward, upper corner as seen in the conveying direction, rests, in the rest position, on a stop (45) affixed to the frame or, respectively, in case of upwardly and downwardly adjustable smoothing rolls (19, 20) fixedly joined to the slide or beam (10).

21. Device according to claim 20, characterized in that the smoothing roll (19) can be moved from the top toward the bottom into its operative position wherein it contacts the upper rim (46) of the insulating glass pane (2), and can be moved, by pivoting the lever arm (27), downwardly around the corner (47) and finally away from the forward, vertical rim (48) of the insulating glass pane (2).

22. Device according to claim 18, characterized in that the supporting arm (44) of the smoothing roll (20) associated with the corner (49) of the insulating glass pane (2) that is the rearward, upper corner as seen in the conveying direction, exhibits a pin (53) engaging into an elongated ear (54) coupled with the piston rod of a pressure medium cylinder (51), wherein the pressure medium cylinder (51) is pivotably supported on the lever arm (27).

23. Device according to claim 22, characterized in that, in the rest position of the smoothing roll (20), the pin (53) contacts the supporting arm (44) at the end of the slot of the elongated ear (54) adjacent to the pivoting axle (29) of the lever arm (27).

24. Device according to claim 23, characterized in that the smoothing roll (20) can be moved out of its rest position into its operative position wherein it contacts the rearward, vertical rim (35) of the insulating glass pane (2) by successive operation of the pressure medium cylinder (51) associated with the elongated ear (54) and the pressure medium cylinder (30) associated with the lever arm (27).

25. Device according to claim 24, characterized in that the pressure medium cylinder (30) associated with the lever arm (27) can be moved, after retraction of the pressure medium cylinder (51) associated with the elongated ear (54), for upward pivoting of the lever arm (27) with simultaneous movement of the smoothing roll (20) around the corner (49) onto the upper rim (46) of the insulating glass pane (2).

* * * * *